(12) United States Patent
Krueger et al.

(10) Patent No.: US 11,204,469 B1
(45) Date of Patent: Dec. 21, 2021

(54) APPARATUS FOR HIGH-EFFICIENCY FIBER-TO-CHIP COUPLING AND MODE-CONVERSION TO INTEGRATED PHOTONICS PLATFORM

(71) Applicant: Honeywell International Inc., Morris Plains, NJ (US)

(72) Inventors: Neil A. Krueger, Saint Paul, MN (US); Matthew Wade Puckett, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/889,503

(22) Filed: Jun. 1, 2020

(51) Int. Cl.
*G02B 6/30* (2006.01)
(52) U.S. Cl.
CPC .................... *G02B 6/305* (2013.01)
(58) Field of Classification Search
CPC ........ G02B 6/1228; G02B 6/124; G02B 6/14; G02B 6/30; G02B 6/305
USPC .............................. 385/43, 49, 50
See application file for complete search history.

(56) References Cited

U.S. PATENT DOCUMENTS

| | | | |
|---|---|---|---|
| 5,296,912 A | 3/1994 | Strandjord et al. |
| 5,349,441 A | 9/1994 | Sanders |
| 6,014,217 A | 1/2000 | Sanders et al. |
| 6,181,860 B1 | 1/2001 | Granestrand et al. |
| 7,065,272 B2 | 6/2006 | Taillaert et al. |
| 7,120,335 B2 | 10/2006 | Agarwal et al. |
| 7,317,853 B2 | 1/2008 | Laurent-Lund et al. |
| 7,643,710 B1 | 1/2010 | Liu |
| 8,068,231 B2 | 11/2011 | Digonnet |
| 8,208,768 B2 | 6/2012 | Su et al. |
| 8,744,225 B2 | 6/2014 | Koshida |

(Continued)

FOREIGN PATENT DOCUMENTS

| | | |
|---|---|---|
| CA | 2417113 A1 | 6/2002 |
| CN | 108020889 A | 5/2018 |

(Continued)

OTHER PUBLICATIONS

Khilo, Anatol, et al.; "Efficient planar fiber-to-chip coupler based on two-stage adiabatic evolution"; Jul. 12, 2010; pp. 15790-15806; vol. 19, No. 15; Optics Express.

(Continued)

*Primary Examiner* — Michael P Mooney
(74) *Attorney, Agent, or Firm* — Fogg & Powers LLC

(57) ABSTRACT

In an example, an optical coupler includes a waveguide structure. The waveguide structure includes a waveguide layer having a proximal end and a distal end. The waveguide layer includes a first waveguide that extends from the proximal end along a first portion of the waveguide layer and widens along a second portion of the first waveguide layer toward the distal end. The waveguide layer further includes one or more additional waveguides that extend from the proximal end along the first portion of the waveguide layer. Each of the one or more additional waveguides narrow along the second portion of the waveguide layer to separate distal tips at the distal end. The waveguide structure is configured to match an integrated photonics mode to a fiber mode supported by an optical fiber at the proximal end and transition the mode to only the first waveguide toward the distal end.

20 Claims, 6 Drawing Sheets

(56) References Cited

U.S. PATENT DOCUMENTS

| | | |
|---|---|---|
| 8,750,654 B2 | 6/2014 | Dupuis et al. |
| 9,025,920 B2 * | 5/2015 | Kim .................. G02B 6/305 385/43 |
| 9,164,235 B1 | 10/2015 | Tummidi et al. |
| 9,316,788 B2 | 4/2016 | Witzens |
| 9,377,587 B2 | 6/2016 | Taylor et al. |
| 9,395,184 B2 | 7/2016 | Qiu et al. |
| 9,703,047 B2 | 7/2017 | Painchaud et al. |
| 9,971,098 B2 | 5/2018 | Zhang |
| 10,197,731 B2 | 2/2019 | Teng et al. |
| 10,261,251 B2 | 4/2019 | Mahgerefteh et al. |
| 10,310,196 B2 | 6/2019 | Hutchison et al. |
| 10,416,381 B1 | 9/2019 | Chen et al. |
| 10,534,136 B1 | 1/2020 | Puckett et al. |
| 10,852,137 B2 | 12/2020 | Bischel et al. |
| 2002/0122615 A1 | 9/2002 | Painter et al. |
| 2003/0035633 A1 | 2/2003 | Agarwal et al. |
| 2003/0053756 A1 | 3/2003 | Lam et al. |
| 2012/0051691 A1 | 3/2012 | Zhang et al. |
| 2012/0230635 A1 | 9/2012 | Yoshida |
| 2013/0170807 A1 | 7/2013 | Hatori et al. |
| 2013/0230274 A1 | 9/2013 | Fish |
| 2013/0266263 A1 | 10/2013 | Kwon et al. |
| 2015/0188659 A1 | 7/2015 | Lipson et al. |
| 2015/0247974 A1 | 9/2015 | Painchaud et al. |
| 2015/0260520 A1 | 9/2015 | Qiu et al. |
| 2016/0085026 A1 | 3/2016 | Yamasaki et al. |
| 2016/0356960 A1 | 12/2016 | Novack et al. |
| 2018/0011249 A1 | 1/2018 | Zhu et al. |
| 2018/0259337 A1 | 9/2018 | Wang |
| 2018/0348432 A1 | 12/2018 | Lambert et al. |
| 2019/0003834 A1 | 1/2019 | Sanders et al. |
| 2019/0265410 A1 | 8/2019 | Testa et al. |
| 2019/0265415 A1 | 8/2019 | Psaila et al. |
| 2019/0293871 A1 | 9/2019 | Horth |
| 2019/0369333 A1 | 12/2019 | Testa et al. |
| 2020/0116489 A1 | 4/2020 | Wang et al. |

FOREIGN PATENT DOCUMENTS

| | | |
|---|---|---|
| CN | 110632702 A | 12/2019 |
| EP | 3421934 A1 | 1/2019 |
| WO | 2018002675 A1 | 1/2018 |
| WO | 2018024347 A1 | 2/2018 |
| WO | 2018130285 A1 | 7/2018 |

OTHER PUBLICATIONS

Son et al., "High-efficiency broadband light coupling between optical fibers and photonic integrated circuits", Nanophotonics, Oct. 20, 2018, pp. 1845-1864, vol. 7, No. 12, De Gruyter.

Tao, S.H., et al,; "Improving coupling efficiency of fiber-waveguide coupling with a double-tip coupler"; Dec. 2, 2008; pp. 20803-20808; vol. 16, No. 25; Optics Express.

U.S. Patent and Trademark Office, "Notice of Allowance", U.S. Appl. No. 16/223,548, dated Sep. 23, 2019, pp. 1-13, Published: US.

Yoo, Keon, et al.; "Design of a High-efficiency Fiber-to-chip Coupler with Reflectors"; Apr. 30, 2016; pp. 123-128; vol. 5, No. 2; IEIE Transactions on Smart Processing and Computing.

U.S. Patent and Trademark Office, "Office Action", U.S. Appl. No. 16/566,553, dated Jan. 29, 2021, pp. 1 through 26, Published: US.

European Patent Office, "Extended European Search Report from EP Application No. 19215444.1", from Foreign Counterpart to U.S. Appl. No. 16/223,548, dated May 19, 2020, pp. 1 through 10, Published: EP.

European Patent Office, "Extended European Search Report from EP Application No. 20194200.0", from Foreign Counterpart to U.S. Appl. No. 16/566,553, dated Dec. 21, 2020, pp. 1 through 12, Published: EP.

U.S. Patent and Trademark Office, "Notice of Allowance", U.S. Appl. No. 16/566,553, dated Jul. 15, 2021, pp. 1 through 11, Published: US.

European Patent Office, "Extended European Search Report and Written Opinion from EP Application No. 21172775.5", from Foreign Counterpart to U.S. Appl. No. 16/889,503, filed Oct. 13, 2021, pp. 1 through 11, Published: EP.

* cited by examiner

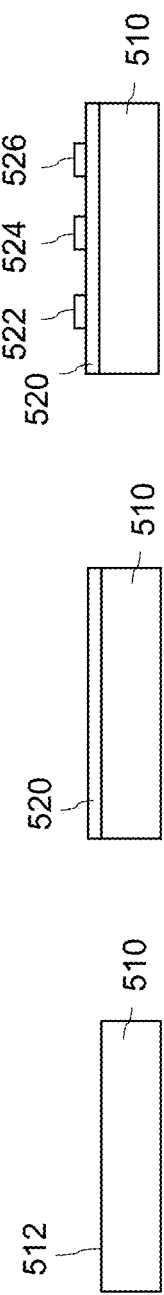

APPARATUS FOR HIGH-EFFICIENCY FIBER-TO-CHIP COUPLING AND MODE-CONVERSION TO INTEGRATED PHOTONICS PLATFORM

BACKGROUND

Integrated photonics offers significant advantages over fiber and free-space optics for a wide range of applications due to its ability to miniaturize optical fields while maintaining high degrees of robustness, resulting in reduced size, weight, and power consumption. Currently, one of the most significant limiting factors facing integrated photonics is the difficulty in interfacing with fiber optics. In coupling light from a fiber to a waveguide, several decibels of power are typically lost.

In prior approaches, lensed fibers or ultra-high numerical aperture fibers are butt-coupled to inverse tapers in integrated photonics chips. The minimum total facet loss that has been achieved in this way is about 0.4 dB, which corresponds to roughly 90% coupling efficiency. However, for many applications an even higher efficiency, ideally approaching 100%, is desired.

Thus, there is a need for a high-efficiency coupler with the flexibility to be applied to many different integrated photonics platforms.

SUMMARY

In an example, an optical coupler includes a waveguide structure. The waveguide structure includes a first waveguide layer having a proximal end and a distal end. The first waveguide layer includes a first waveguide that extends from the proximal end along a first portion of the first waveguide layer. The first waveguide widens along a second portion of the first waveguide layer toward the distal end of the first waveguide layer. The first waveguide layer further includes one or more additional waveguides that extend from the proximal end along the first portion of the first waveguide layer. Each of the one or more additional waveguides narrow along the second portion of the first waveguide layer to separate distal tips at the distal end of the first waveguide layer. The waveguide structure is configured to match an integrated photonics mode to a fiber mode supported by an optical fiber at the proximal end and transition the mode to only the first waveguide toward the distal end.

DRAWINGS

Understanding that the drawings depict only some embodiments and are not therefore to be considered limiting in scope, the exemplary embodiments will be described with additional specificity and detail using the accompanying drawings, in which:

FIGS. 5A-5I are perspective views depicting an example method of fabricating a fiber-to-waveguide optical coupler.

Figure 1:
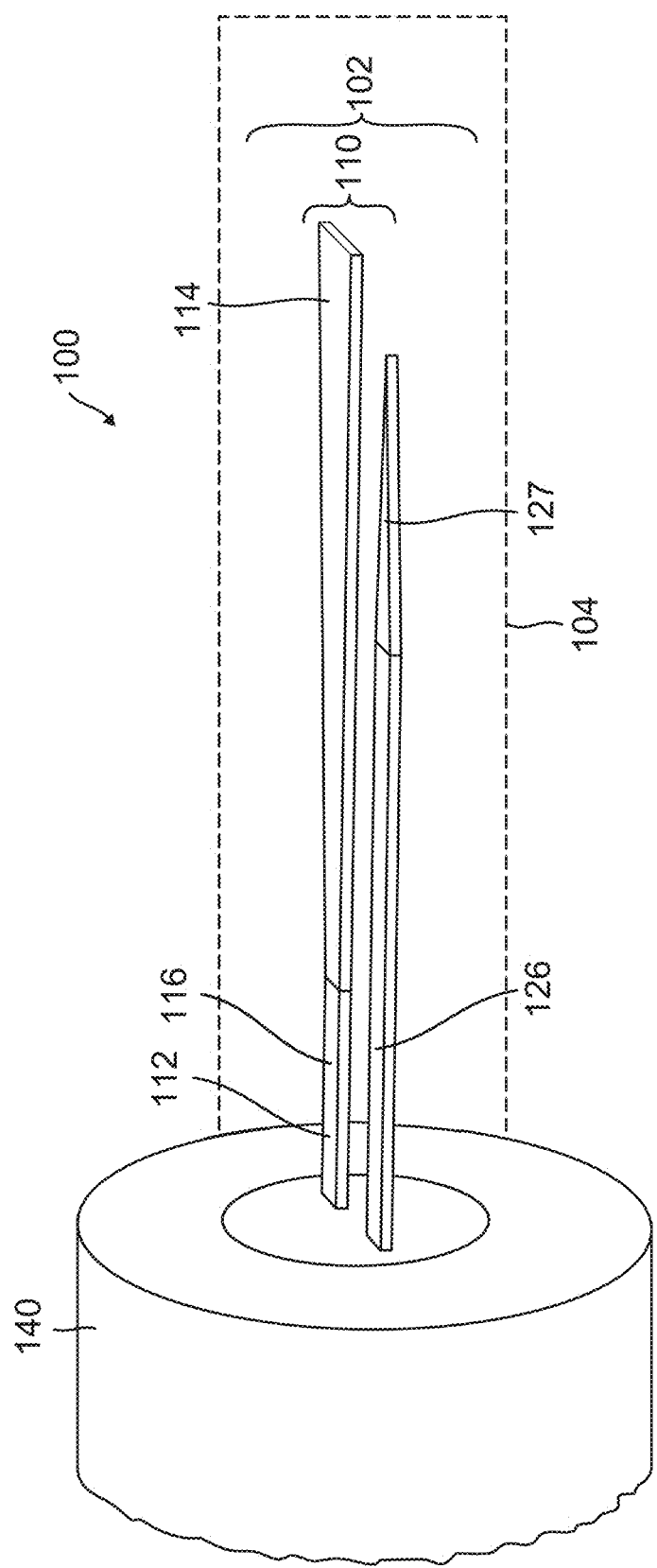
FIG. 1 is a perspective side view of an example fiber-to-waveguide optical coupler.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Example high-efficiency fiber-to-waveguide optical couplers are described herein. In general, the fiber-to-waveguide optical couplers include a waveguide structure that matches an integrated photonics mode to the mode supported by a standard optical fiber. In some examples, the mode matching, combined with subsequent adiabatic transitions, result in a higher efficiency for coupling from a fiber mode to a waveguide mode. This mode matching can be extended to support a wide range of different material platforms.

For example, the fiber-to-waveguide optical couplers can be implemented in a resonator fiber-optic gyroscope (RFOG) to direct light into and out of an optical resonator of the RFOG. The greater coupling efficiency of the fiber-to-waveguide optical couplers can lead to significant improvements in RFOG performance. In other implementations, the fiber-to-waveguide optical coupler can be employed to direct light onto chip-scale light detection and ranging (LIDAR) devices. The fiber-to-waveguide optical coupler can also be used as an optical interconnect for a variety of optical devices.

To couple light into a device, an optical fiber is positioned into alignment with the fiber-to-waveguide optical coupler. For example, the optical fiber can be brought into direct contact with a diced edge of a chip, at which point the fiber-to-waveguide optical coupler is positioned. The optical fiber can be optionally bonded to a facet of the fiber-to-waveguide optical coupler using index matching epoxy.

The efficiency of the initial hand-off from the fiber mode to the waveguide mode is theoretically simulated to be greater than about 99%, and the following adiabatic transition into a single waveguide layer is theoretically simulated to be greater than about 99.9%.

FIG. 1 illustrates an example fiber-to-waveguide optical coupler 100. The optical coupler 100 comprises a waveguide structure 102 surrounded by and embedded in a cladding 104. The waveguide structure 102 includes a waveguide layer 110 that includes waveguides 116, 126. While FIG. 1 shows two waveguides 116, 126, it should be understood that the waveguide layer 110 could also include three or more waveguides.

The waveguide layer 110 has a proximal end 112 and a distal end 114. The first waveguide 116 and the second waveguide 126 extend from the proximal end 112 along a first portion of the waveguide layer 110. The first waveguide 116 widens along a second portion of the waveguide layer 110 toward the distal end 114 of the waveguide layer 110. The second waveguide 126 narrows along the second portion of the waveguide layer 110 to a distal tip 127 toward the distal end 114 of the waveguide layer 110. In some examples, the first waveguide 116 and the second waveguide 126 can have a thickness of about 25 nm to about 100 nm.

The waveguide layer 110 can be composed of various higher index optically transmissive materials, such as silicon, silicon nitride (SiNx), silicon oxynitride (SiON), silicon carbide (SiC), diamond, silicon germanium (SiGe), germanium, gallium arsenide (GaAs), gallium nitride (GaN), gallium phosphide (GaP), lithium niobate (LiNbO$_3$), titanium dioxide (TiO$_2$), combinations thereof, or similar materials.

In some examples, the cladding 104 can be composed of various lower index materials. For example, the cladding 104 can be composed of materials such as silicon dioxide (SiO$_2$), silicon oxynitride (SiON), zinc oxide (ZnO) (used with Si waveguide or other similarly high index waveguide), aluminum oxide (Al$_2$O$_3$), calcium fluoride (CaF$_2$), combinations thereof, or similar materials.

The waveguide structure 102 is configured to couple an optical fiber 140 to an integrated photonics platform, such that an integrated photonics mode is matched to a fiber mode supported by optical fiber 140. Further, by widening the first waveguide 116 while narrowing the second waveguide 126, the optical coupler 100 gradually converts or pulls the optical mode into the first waveguide 116 such that the optical mode is only included in the first waveguide 116 at the distal end 114.

For some of the applications, even small back-reflections from the terminated waveguide 126 can have a negative impact on performance. In some examples, the second waveguide 126 also adiabatically bends away (diverges) from the first waveguide 116 along the second portion of the waveguide layer 110 toward the distal end 114, which reduces the amount of back-reflection from the point of termination of the second waveguide 126 to be virtually unmeasurable. Generally, it is desirable for the second waveguide 126 to diverge from the first waveguide 116 in a manner such that the absolute distance between the second waveguide 126 and the first waveguide 116 increases toward the distal end 114. However, the second waveguide 126 can diverge from the first waveguide 116 in any way that does not cause an intersection with the first waveguide 116.

In some examples, the waveguide layer 110 further includes a third waveguide (not shown). In such examples, the third waveguide narrows along the second portion of the waveguide layer 110 to a distal tip toward the distal end 114 of the waveguide layer similar to the second waveguide 126. In some examples, the second waveguide 126 and/or the third waveguide adiabatically bend away (diverge) from the first waveguide 116 along the second portion of the waveguide layer 110 toward the distal end 114. In some examples, the first waveguide 116 can be positioned between the second waveguide 126 and the third waveguide. In other examples, the second waveguide 126 can be positioned between the first waveguide 116 and the third waveguide or the third waveguide can be positioned between the first waveguide 116 and the second waveguide 126.

Various methods can be used to fabricate optical coupler 100, such as plasma enhanced chemical vapor deposition (PECVD), sputtering, low pressure CVD, atomic layer deposition, combinations thereof, or the like.

Figure 2:
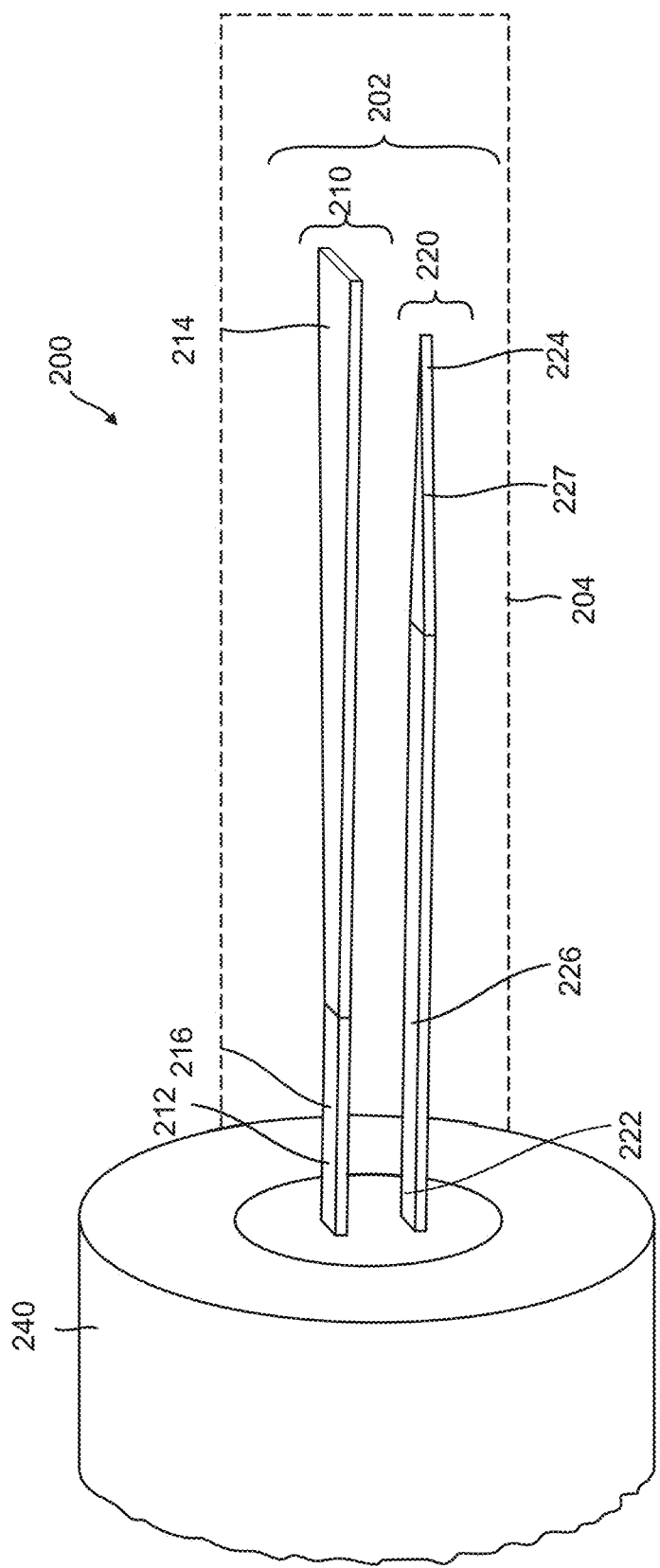
FIG. 2 is a perspective side view of another example fiber-to-waveguide optical coupler.

FIG. 2 illustrates an example fiber-to-waveguide optical coupler 200. The optical coupler 200 comprises a waveguide structure 202 surrounded by and embedded in a cladding 204. The waveguide structure 202 includes a first waveguide layer 210 and a second waveguide layer 220 separated from first waveguide layer 210 by a predetermined distance. While FIG. 2 shows a single waveguide 216, 226 in the waveguide layers 210, 220, it should be understood that the waveguide layers 210, 220 could also include two or more waveguides. Also, while FIG. 2 shows two waveguide layers 210, 220, it should be understood that more than two waveguide layers can be implemented.

The first waveguide layer 210 has a proximal end 212 and a distal end 214. The first waveguide layer 210 includes a first waveguide 216 that extends from the proximal end 212 along a first portion of first waveguide layer 210. The first waveguide 216 widens along a second portion of first waveguide layer 210 toward distal end 214. In some examples, the first waveguide 216 can have a thickness of about 25 nm to about 100 nm.

The second waveguide layer 220 has a proximal end 222 and a distal end 224. The second waveguide layer 220 includes a second waveguide 226 that extends from the proximal end 222 along a first portion of second waveguide layer 220. The second waveguide 226 narrows along a second portion of second waveguide layer 220 to a distal tip 227 toward distal end 224. In some examples, the second waveguide 226 can have a thickness of about 25 nm to about 100 nm. In some examples, the second waveguide layer 220 is separated from the first waveguide layer 210 by a distance of about 1 µm to about 4 µm.

The first and second waveguide layers 210, 220 can be composed of various higher index optically transmissive materials, such as silicon, silicon nitride (SiNx), silicon oxynitride (SiON), silicon carbide (SiC), diamond, silicon germanium (SiGe), germanium, gallium arsenide (GaAs), gallium nitride (GaN), gallium phosphide (GaP), lithium niobate (LiNbO$_3$), titanium dioxide (TiO$_2$), or combinations thereof.

In some examples, the first waveguide layer 210 is composed of a different material than the second waveguide layer 220. In such examples, the first waveguide layer 210 is composed of a material that can be easily deposited and the second waveguide layer 220 is composed of a different material. In some such examples, the second waveguide layer 220 is composed of a material that cannot be deposited (for example, a crystalline material). In some examples, since the refractive indices of the first waveguide layer 210 and the second waveguide layer 220 may be unequal, the optimal coupler geometry will include unequal widths and/or waveguide spacing in the first waveguide layer 210 compared to the second waveguide layer 220.

In other examples, the first waveguide layer 210 and the second waveguide layer 220 are composed of the same material. In some such examples, the first waveguide layer 210 and the second waveguide layer 220 are composed of a material that can be easily deposited.

While FIG. 2 shows that the waveguide 216 in the top waveguide layer 210 widens toward the distal end 214, it should be understood that other implementations are also possible. For example, the waveguide 226 in the bottom waveguide layer 220 could widen toward the distal end 224 while the waveguide 216 in the top waveguide layer 210 narrows toward the distal end 214.

The waveguide structure 202 is configured to couple an optical fiber 240 to an integrated photonics platform, such that an integrated photonics mode is matched to a fiber mode supported by optical fiber 240. Further, by widening the first waveguide 216 while narrowing the second waveguide 226, the optical coupler 200 gradually converts or pulls the optical mode into the first waveguide 216 such that the optical mode is only included in the first waveguide 216 at the distal end 214.

For some of the applications, even small back-reflections from the terminated waveguide 226 can have a negative impact on performance. In some examples, the second waveguide 226 also adiabatically bends away (diverges) from the first waveguide 216 along the second portion of the first waveguide layer 210 toward the distal end 214, which reduces the amount of back-reflection from the point of termination of the second waveguide 226 to be virtually unmeasurable. Generally, it is desirable for the second waveguide 226 to diverge from the first waveguide 216 in a manner such that the absolute distance between the second waveguide 226 and the first waveguide 216 increases toward the distal end 214. However, the second waveguide 226 can diverge from the first waveguide 216 in any way that does not cause an intersection with the first waveguide 216.

Various methods can be used to fabricate optical coupler 200, such as plasma enhanced chemical vapor deposition (PECVD), sputtering, low pressure CVD, atomic layer deposition, combinations thereof, or the like.

Figure 3A:
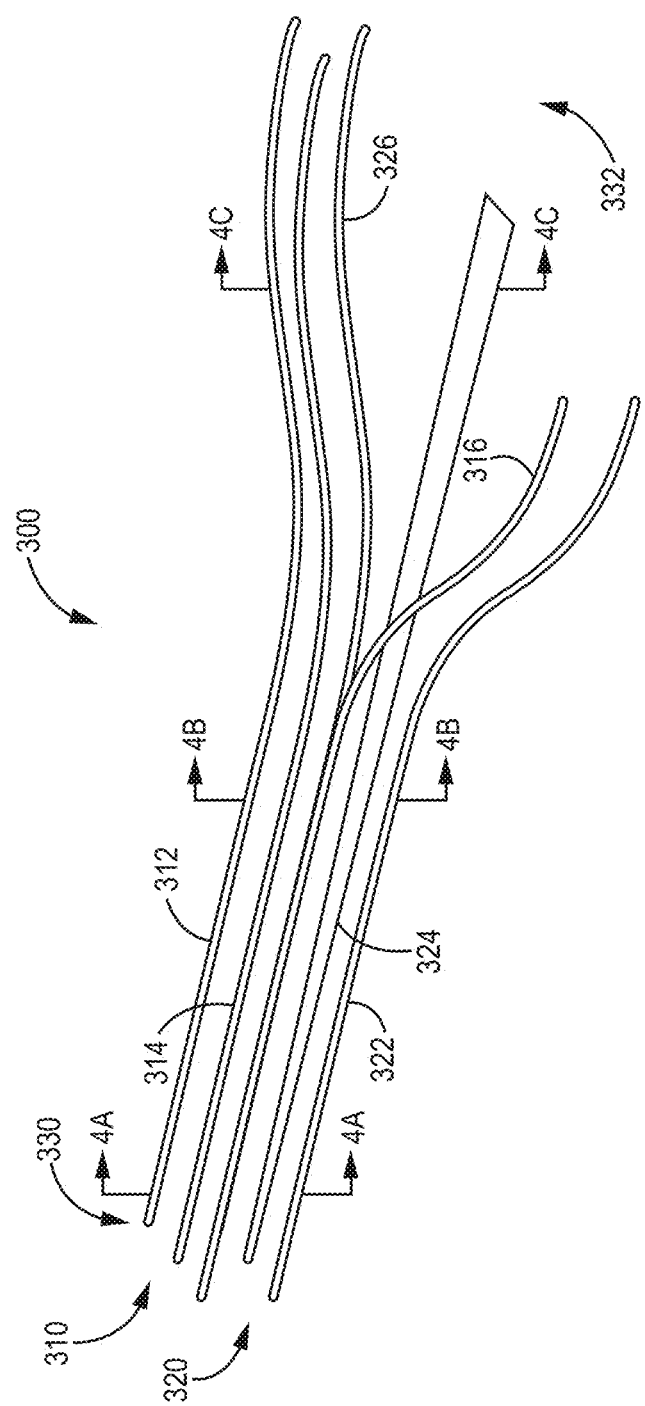
FIGS. 3A-3B are perspective views of another example fiber-to-waveguide optical coupler.
Figure 3B:
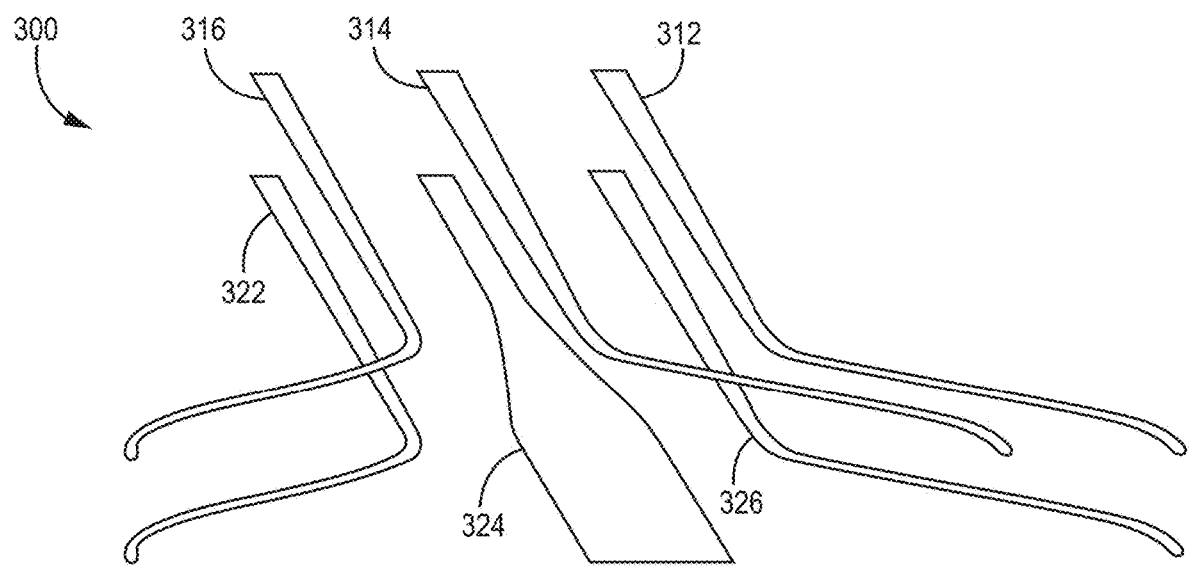

FIGS. 3A-3B illustrate an example fiber-to-waveguide optical coupler 300. The optical coupler 300 comprises a waveguide structure that includes a first waveguide layer 310 and a second waveguide layer 320 separated from first waveguide layer 310. The first waveguide layer 310 includes a first plurality of waveguides 312, 314, 316 that extend from an input end 330. Each of the waveguides of the first plurality of waveguides 312, 314, 316 narrows toward an output end 332 and terminate at respective distal tips. The second waveguide layer 320 includes a second plurality of waveguides 322, 324, 326 that extend from input end 330. One waveguide 324 of the second plurality of waveguides 322, 324, 326 widens toward the output end 332 and the other waveguides 322, 326 of the second plurality of waveguides each narrow toward output end 332 and terminate at respective distal tips. In some examples, the first waveguide layer 310 and the second waveguide layer 320 can have a thickness of about 25 nm to about 100 nm. In some examples, the second waveguide layer 320 is separated from the first waveguide layer 310 by a distance of about 1 µm to about 4 µm.

The first and second waveguide layers 310, 320 can be composed of various higher index optically transmissive materials, such as silicon, silicon nitride (SiNx), silicon oxynitride (SiON), silicon carbide (SiC), diamond, silicon germanium (SiGe), germanium, gallium arsenide (GaAs), gallium nitride (GaN), gallium phosphide (GaP), lithium niobate (LiNbO$_3$), titanium dioxide (TiO$_2$), or combinations thereof.

In some examples, the first waveguide layer 310 is composed of a different material than the second waveguide layer 320. In such examples, the first waveguide layer 310 is composed of a material that can be easily deposited and the second waveguide layer 320 is composed of a different material. In some such examples, the second waveguide layer 320 is composed of a material that cannot be deposited (for example, a crystalline material). In some examples, since the refractive indices of the first waveguide layer 310 and the second waveguide layer 320 may be unequal, the optimal coupler geometry will include unequal widths and/or waveguide spacing in the first waveguide layer 310 compared to the second waveguide layer 320.

In other examples, the first waveguide layer 310 and the second waveguide layer 320 are composed of the same material. In some such examples, the first waveguide layer 310 and the second waveguide layer 320 are composed of a material that can be easily deposited.

While FIGS. 3A-3B show that the waveguide 324 in the bottom waveguide layer 320 widens toward the output end 332, it should be understood that other implementations are also possible. In other examples, any of the other waveguides 312, 314, 316, 322, 326 could widen toward the output end 332 instead of waveguide 324.

The optical coupler 300 is configured to couple an optical fiber to an integrated photonics platform, such that an integrated photonics mode is matched to a fiber mode supported by optical fiber. Further, by widening the waveguide 324 while narrowing the other waveguides 312, 314, 316, 322, 326, the optical coupler 300 gradually converts or pulls the optical mode into the widened waveguide 324 such that the optical mode is only included in the widened waveguide 324 at the output end 332.

For some of the applications, even small back-reflections from the terminated waveguides 312, 314, 316, 322, 324 can have a negative impact on performance. In the example shown in FIGS. 3A-3B, each of the waveguides of the first plurality of waveguides 312, 314, 316 and the waveguides 322, 326 adiabatically bend away (diverge) from the waveguide 324 that widens toward the output end 332, which reduces the amount of back-reflection from the points of termination of the waveguides 312, 314, 316, 322, 326 to be virtually unmeasurable. Generally, it is desirable for the narrowed waveguides 312, 314, 316, 322, 326 to diverge from the widened waveguide 324 in a manner such that the absolute distance between each of the narrowed waveguides 312, 314, 316, 322, 326 and the widened waveguide 324 increases toward the output end 332. However, the narrowed waveguides 312, 314, 316, 322, 326 can diverge from the widened waveguide 324 in any way that does not cause an intersection with the widened waveguide 324. The example shown in FIGS. 3A-3B results in better performance and a more efficient and complete transition of the optical mode into the single, widened waveguide 324.

Following the fiber-to-waveguide transition (first transition) at input end 330 of optical coupler 300, the optical mode is adiabatically transitioned (second transition) into the waveguide layer 324 toward output end 332. This second transition is simulated to have a greater than about 99.9% efficiency.

While FIGS. 3A-3B show two waveguides layers that each include three waveguides, it should be understood that other implementations are also possible. For example, a different number of waveguides layers (for example, one or three) could be included in the optical coupler and each waveguide layer could include a different number of waveguides (for example, more or less than three). In principle, the coupling efficiency increases when more waveguides are included in the optical coupler. However, in practice, fewer waveguides in the optical coupler can provide coupling efficiency at levels sufficient for most, if not all, applications.

Various methods can be used to fabricate optical coupler 300, such as plasma enhanced chemical vapor deposition (PECVD), sputtering, low pressure CVD, atomic layer deposition, combinations thereof, or the like.

Figure 4A:
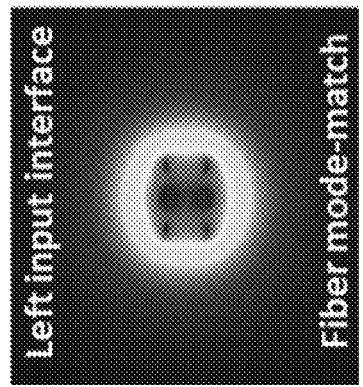
FIGS. 4A-4C are modeled graphical representations of the simulated mode profile transitions for the example optical coupler of FIGS. 3A-3B.
Figure 4B:
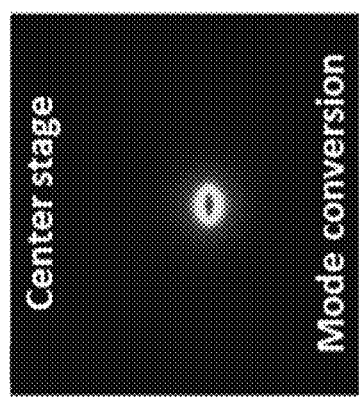
Figure 4C:
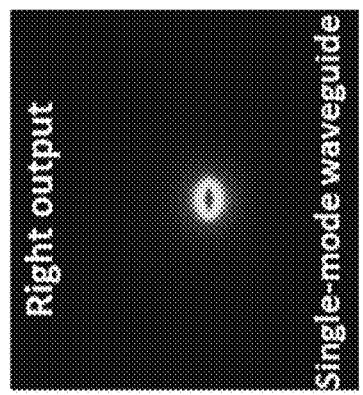

FIGS. 4A-4C are modeled graphical representations of the simulated mode profile transitions taken along optical coupler 300 of FIG. 3A, from input end 330 (lines 4A) to output end 332 (lines 4C). As shown in FIG. 4A, the mode profile of the light is equally spaced in the waveguide layers 310, 320 at input end 330. The mode profile then transitions to the waveguide 324 in the second waveguide layer 320, as shown in FIG. 4B. Thereafter, the mode profile completes the transition into the waveguide 324 toward output end 332, as depicted in FIG. 4C.

FIGS. 5A-5I depict an exemplary method of fabricating a fiber-to-waveguide optical coupler, such as optical coupler 300. Fabrication of the optical coupler begins with a wafer substrate 510 having an upper surface 512, as shown in FIG. 5A. The wafer substrate 510 can be formed of a first material that possesses a lower refractive index, such as silicon dioxide, for example. Next, a first waveguide layer 520 is formed by depositing a second material on upper surface 512 of wafer substrate 510, as shown in FIG. 5B. The second material has a higher refractive index than the first material. For example, the second material can be silicon, silicon nitride (SiNx), silicon oxynitride (SiON), silicon carbide (SiC), diamond, silicon germanium (SiGe), germanium, gallium arsenide (GaAs), gallium nitride (GaN), gallium phosphide (GaP), lithium niobate (LiNbO$_3$), titanium dioxide (TiO$_2$), or combinations thereof. In some such examples, the second material is deposited to have a thickness of about 25 nm to about 100 nm on a wafer using PECVD.

A first plurality of waveguides is formed from first waveguide layer 520. In some examples, the plurality of waveguides is formed using conventional lithography, dry etching, and deposition techniques. As shown in FIG. 5C, a first plurality of resist layers 522, 524, 526 are formed on first waveguide layer 520 such as through resist spinning and lithography techniques. A first plurality of waveguides 530, 532, 534 are then formed from first waveguide layer 520 by etching and resist removal, as depicted in FIG. 5D.

A first cladding layer 540 is then formed, by depositing the same first material as used for wafer substrate 510, over the first plurality of waveguides 530, 532, 534, as depicted in FIG. 5E. In some examples, the cladding layer 540 can be formed by depositing a layer of first material having a thickness of about 2.5 μm to about 3.5 μm. An optional chemical mechanical planarization (CMP) process can be performed on an upper surface 542 of the cladding layer 540.

Thereafter, a second waveguide layer 550 is formed by depositing a third material, having the higher refractive index, over the upper surface 542 of the cladding layer 540, as shown in FIG. 5F. In some examples, the third material can be the same as the second material. In other examples, the third material is a different material than the second material. In some examples, the third material is deposited to have a thickness that is different than the second material. In some such examples, the thickness of the third material is less than or greater than the thickness of the second material such that better matching can be obtained.

A second plurality of waveguides is then formed from second waveguide layer 550 by conventional lithography, dry etching, and deposition techniques. As shown in FIG. 5G, a second plurality of resist layers 552, 554, 556 are formed on second waveguide layer 550 such as through resist spinning and lithography techniques. A second plurality of waveguides 560, 562, 564 is then formed from second waveguide layer 550 by etching and resist removal, as depicted in FIG. 5H. In some examples, the spacing between the waveguides 560, 562, 564 and the thickness of the waveguides 560, 562, 564 is the same as the spacing between the waveguides 530, 532, 534 and the thickness of the waveguides 530, 532, 534. In other examples, the spacing between the waveguides 560, 562, 564 is the different than the spacing between the waveguides 530, 532, 534 and/or the thickness of the waveguides 560, 562, 564 is different than the thickness of the waveguides 530, 532, 534.

Finally, an additional amount of the first material is deposited over waveguides 560, 562, 564 to form a second cladding layer 570, as depicted in FIG. 5I. In some examples, the second cladding layer 570 can be formed by depositing a layer of the first material having a thickness of about 2 μm to about 4 μm.

Example Embodiments

Example 1 includes an optical coupler, comprising: a waveguide structure comprising: a first waveguide layer having a proximal end and a distal end, the first waveguide layer including: a first waveguide that extends from the proximal end along a first portion of the first waveguide layer, wherein the first waveguide widens along a second portion of the first waveguide layer toward the distal end of the first waveguide layer; and one or more additional waveguides that extend from the proximal end along the first portion of the first waveguide layer, wherein each of the one or more additional waveguides narrow along the second portion of the first waveguide layer to separate distal tips at the distal end of the first waveguide layer; and wherein the waveguide structure is configured to match an integrated photonics mode to a fiber mode supported by an optical fiber at the proximal end, wherein the waveguide structure is configured to transition the mode to only the first waveguide toward the distal end.

Example 2 includes the optical coupler of Example 1, wherein the one or more additional waveguides diverge from the first waveguide along the second portion of the first waveguide layer toward the distal end of the first waveguide layer.

Example 3 includes the optical coupler of any of Examples 1-2, wherein the one or more additional waveguides includes a second waveguide and a third waveguide, wherein the second waveguide narrows along the second portion of the first waveguide layer to a first distal tip at the distal end of the first waveguide layer, wherein the third waveguide narrows along the second portion of the first waveguide layer to a second distal tip at the distal end of the first waveguide layer.

Example 4 includes the optical coupler of Example 3, wherein the first waveguide is positioned between the second waveguide and the third waveguide in the first waveguide layer.

Example 5 includes the optical coupler of Example 3, wherein the second waveguide is positioned between the first waveguide and the third waveguide in the first waveguide layer.

Example 6 includes the optical coupler of any of Examples 1-5, wherein the first waveguide and the one or more additional waveguides are embedded in a cladding.

Example 7 includes an optical coupler, comprising: a waveguide structure comprising: a first waveguide layer having a proximal end and a distal end, the first waveguide layer including a first waveguide that extends from the proximal end along a first portion of the first waveguide layer, wherein the first waveguide widens along a second portion of the first waveguide layer toward the distal end of the first waveguide layer; and a second waveguide layer separated from the first waveguide layer, the second waveguide layer having a proximal end and a distal end, the second waveguide layer including a second waveguide that extends from the proximal end along a first portion of the second waveguide layer, wherein the second waveguide narrows along a second portion of the second waveguide layer to a first distal tip at the distal end of the second waveguide layer; and wherein the waveguide structure is configured to match an integrated photonics mode to a fiber mode supported by an optical fiber at the proximal end, wherein the waveguide structure is configured to transition the mode to only the first waveguide toward the distal end of the first waveguide layer.

Example 8 includes the optical coupler of Example 7, wherein the second waveguide diverges from the first waveguide along the second portion of the second waveguide layer toward the distal end of the second waveguide layer.

Example 9 includes the optical coupler of any of Examples 7-8, wherein the first waveguide layer further includes one or more additional waveguides that extend from the proximal end along the first portion of the first waveguide layer, wherein each of the one or more additional waveguides narrow along the second portion of the first waveguide layer to separate distal tips at the distal end of the first waveguide layer, wherein the one or more additional waveguides diverge from the first waveguide along the second portion of the first waveguide layer toward the distal end of the first waveguide layer.

Example 10 includes the optical coupler of Example 9, wherein the one or more additional waveguides includes a third waveguide and a fourth waveguide, wherein the third waveguide narrows along the second portion of the first waveguide layer to a second distal tip at the distal end of the first waveguide layer, wherein the fourth waveguide narrows along the second portion of the first waveguide layer to a third distal tip at the distal end of the first waveguide layer.

Example 11 includes the optical coupler of Example 10, wherein the first waveguide is positioned between the third waveguide and the fourth waveguide in the first waveguide layer.

Example 12 includes the optical coupler of Example 10, wherein the third waveguide is positioned between the first waveguide and the fourth waveguide in the first waveguide layer.

Example 13 includes the optical coupler of any of Examples 10-12, wherein the third waveguide and the fourth waveguide diverge from the first waveguide along the second portion of the first waveguide layer toward the distal end of the first waveguide layer.

Example 14 includes the optical coupler of any of Examples 10-13, wherein the second waveguide layer further includes a fifth waveguide and a sixth waveguide, wherein the fifth waveguide narrows along the second portion of the second waveguide layer to a fourth distal tip at the distal end of the first waveguide layer, wherein the fourth waveguide narrows along the second portion of the second waveguide layer to a fifth distal tip at the distal end of the second waveguide layer.

Example 15 includes the optical coupler of Example 14, wherein the fifth waveguide and the sixth waveguide diverge from the first waveguide along the second portion of the second waveguide layer toward the distal end of the second waveguide layer.

Example 16 includes the optical coupler of any of Examples 7-15, wherein the first waveguide and the second waveguide are composed of the same material.

Example 17 includes the optical coupler of any of Examples 7-15, wherein the first waveguide and the second waveguide are composed of different materials.

Example 18 includes the optical coupler of any of Examples 7-17, further comprising: a third waveguide layer separated from the first waveguide layer and the second waveguide layer, the third waveguide layer having a proximal end and a distal end, the third waveguide layer including a third waveguide that extends from the proximal end along a first portion of the third waveguide layer, wherein the third waveguide narrows along a second portion of the third waveguide layer to a second distal tip at the distal end of the third waveguide layer.

Example 19 includes an optical coupler, comprising: a waveguide structure comprising: a first waveguide layer having a proximal end and a distal end, the first waveguide layer including: a first waveguide that extends from the proximal end along a first portion of the first waveguide layer, wherein the first waveguide widens along a second portion of the first waveguide layer toward the distal end of the first waveguide layer; and one or more additional waveguides that extend from the proximal end along the first portion of the first waveguide layer, wherein each of the one or more additional waveguides narrow along the second portion of the first waveguide layer to separate distal tips at the distal end of the first waveguide layer; and a second waveguide layer separated from the first waveguide layer, the second waveguide layer having a proximal end and a distal end, the second waveguide layer including a plurality of waveguides that extend from the proximal end along a first portion of the second waveguide layer, wherein each waveguide of the plurality of waveguides narrows along a second portion of the second waveguide layer to a respective distal tip at the distal end of the second waveguide layer; wherein the waveguide structure is configured to match an integrated photonics mode to a fiber mode supported by an optical fiber at the proximal end, wherein the waveguide structure is configured to transition the mode to only the first waveguide toward the distal end.

Example 20 includes the optical coupler of Example 19, wherein the one or more additional waveguides diverge from the first waveguide along the second portion of the first waveguide layer toward the distal end of the first waveguide layer; and wherein each waveguide of the plurality of waveguides diverges from the first waveguide along the second portion of the second waveguide layer toward the distal end of the second waveguide layer.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An optical coupler, comprising:
a waveguide structure comprising:
   a first waveguide layer having a proximal end and a distal end, the first waveguide layer including:
     a first waveguide that extends from the proximal end along a first portion of the first waveguide layer, wherein the first waveguide widens along a second portion of the first waveguide layer toward the distal end of the first waveguide layer; and
     one or more additional waveguides that extend from the proximal end along the first portion of the first waveguide layer, wherein each of the one or more additional waveguides narrow along the second portion of the first waveguide layer to separate distal tips at the distal end of the first waveguide layer; and
   wherein the first waveguide and the one or more additional waveguides of the waveguide structure are configured to match an integrated photonics mode to a fiber mode supported by an optical fiber at the proximal end, wherein the waveguide structure is configured to transition the mode to only the first waveguide toward the distal end.

2. The optical coupler of claim 1, wherein the one or more additional waveguides diverge from the first waveguide along the second portion of the first waveguide layer toward the distal end of the first waveguide layer.

3. The optical coupler of claim 1, wherein the one or more additional waveguides includes a second waveguide and a third waveguide, wherein the second waveguide narrows along the second portion of the first waveguide layer to a first distal tip at the distal end of the first waveguide layer, wherein the third waveguide narrows along the second portion of the first waveguide layer to a second distal tip at the distal end of the first waveguide layer.

4. The optical coupler of claim 3, wherein the first waveguide is positioned between the second waveguide and the third waveguide in the first waveguide layer.

5. The optical coupler of claim 3, wherein the second waveguide is positioned between the first waveguide and the third waveguide in the first waveguide layer.

6. The optical coupler of claim 1, wherein the first waveguide and the one or more additional waveguides are embedded in a cladding.

7. An optical coupler, comprising:
a waveguide structure comprising:
a first waveguide layer having a proximal end and a distal end, the first waveguide layer including a first waveguide that extends from the proximal end along a first portion of the first waveguide layer, wherein the first waveguide widens along a second portion of the first waveguide layer toward the distal end of the first waveguide layer; and
a second waveguide layer separated from the first waveguide layer, the second waveguide layer having a proximal end and a distal end, the second waveguide layer including a second waveguide that extends from the proximal end along a first portion of the second waveguide layer, wherein the second waveguide narrows along a second portion of the second waveguide layer to a first distal tip at the distal end of the second waveguide layer, wherein the second waveguide narrows as the first waveguide wides; and
wherein the waveguide structure is configured to match an integrated photonics mode to a fiber mode supported by an optical fiber at the proximal end, wherein the waveguide structure is configured to transition the mode to only the first waveguide toward the distal end of the first waveguide layer.

8. The optical coupler of claim 7, wherein the second waveguide diverges from the first waveguide along the second portion of the second waveguide layer toward the distal end of the second waveguide layer.

9. The optical coupler of claim 7, wherein the first waveguide layer further includes one or more additional waveguides that extend from the proximal end along the first portion of the first waveguide layer, wherein each of the one or more additional waveguides narrow along the second portion of the first waveguide layer to separate distal tips at the distal end of the first waveguide layer, wherein the one or more additional waveguides diverge from the first waveguide along the second portion of the first waveguide layer toward the distal end of the first waveguide layer.

10. The optical coupler of claim 9, wherein the one or more additional waveguides includes a third waveguide and a fourth waveguide, wherein the third waveguide narrows along the second portion of the first waveguide layer to a second distal tip at the distal end of the first waveguide layer, wherein the fourth waveguide narrows along the second portion of the first waveguide layer to a third distal tip at the distal end of the first waveguide layer.

11. The optical coupler of claim 10, wherein the first waveguide is positioned between the third waveguide and the fourth waveguide in the first waveguide layer.

12. The optical coupler of claim 10, wherein the third waveguide is positioned between the first waveguide and the fourth waveguide in the first waveguide layer.

13. The optical coupler of claim 10, wherein the third waveguide and the fourth waveguide diverge from the first waveguide along the second portion of the first waveguide layer toward the distal end of the first waveguide layer.

14. The optical coupler of claim 10, wherein the second waveguide layer further includes a fifth waveguide and a sixth waveguide, wherein the fifth waveguide narrows along the second portion of the second waveguide layer to a fourth distal tip at the distal end of the first waveguide layer, wherein the fourth waveguide narrows along the second portion of the second waveguide layer to a fifth distal tip at the distal end of the second waveguide layer.

15. The optical coupler of claim 14, wherein the fifth waveguide and the sixth waveguide diverge from the first waveguide along the second portion of the second waveguide layer toward the distal end of the second waveguide layer.

16. The optical coupler of claim 7, wherein the first waveguide and the second waveguide are composed of the same material.

17. The optical coupler of claim 7, wherein the first waveguide and the second waveguide are composed of different materials.

18. The optical coupler of claim 7, further comprising:
a third waveguide layer separated from the first waveguide layer and the second waveguide layer, the third waveguide layer having a proximal end and a distal end, the third waveguide layer including a third waveguide that extends from the proximal end along a first portion of the third waveguide layer, wherein the third waveguide narrows along a second portion of the third waveguide layer to a second distal tip at the distal end of the third waveguide layer.

19. An optical coupler, comprising:
a waveguide structure comprising:
a first waveguide layer having a proximal end and a distal end, the first waveguide layer including:
a first waveguide that extends from the proximal end along a first portion of the first waveguide layer, wherein the first waveguide widens along a second portion of the first waveguide layer toward the distal end of the first waveguide layer; and
one or more additional waveguides that extend from the proximal end along the first portion of the first waveguide layer, wherein each of the one or more additional waveguides narrow along the second portion of the first waveguide layer to separate distal tips at the distal end of the first waveguide layer; and
a second waveguide layer separated from the first waveguide layer, the second waveguide layer having a proximal end and a distal end, the second waveguide layer including a plurality of waveguides that extend from the proximal end along a first portion of the second waveguide layer, wherein each waveguide of the plurality of waveguides narrows along a second portion of the second waveguide layer to a respective distal tip at the distal end of the second waveguide layer;
wherein the waveguide structure is configured to match an integrated photonics mode to a fiber mode supported by an optical fiber at the proximal end, wherein the waveguide structure is configured to transition the mode to only the first waveguide toward the distal end.

20. The optical coupler of claim 19, wherein the one or more additional waveguides diverge from the first waveguide along the second portion of the first waveguide layer toward the distal end of the first waveguide layer; and wherein each waveguide of the plurality of waveguides diverges from the first waveguide along the second portion of the second waveguide layer toward the distal end of the second waveguide layer.

\* \* \* \* \*